W. DE FRANG.
BREAD CUTTING MACHINE.
APPLICATION FILED AUG. 24, 1915.
1,177,234.
Patented Mar. 28, 1916.
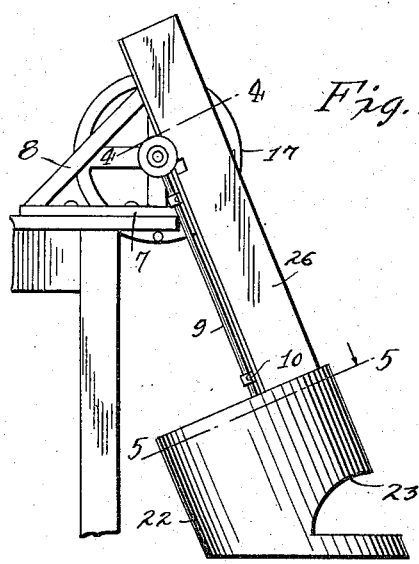
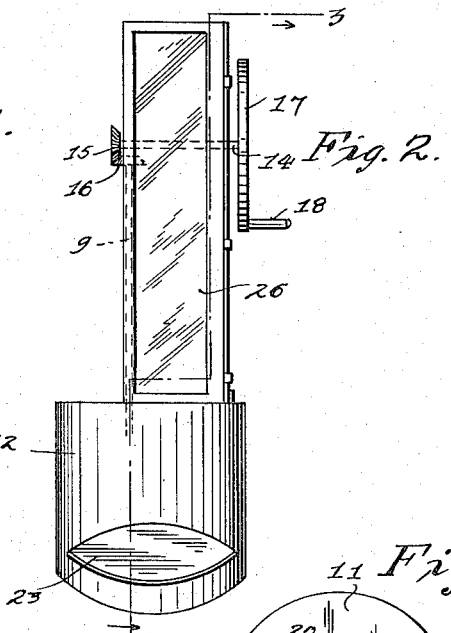
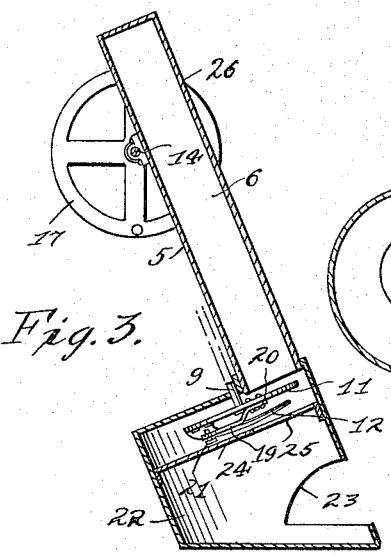
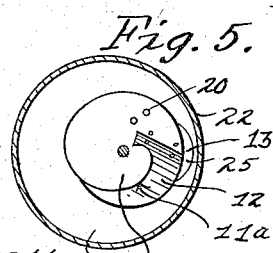
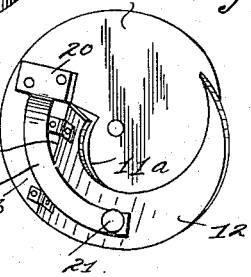
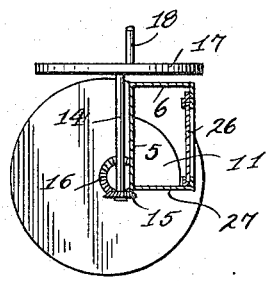
Inventor
W. DeFrang.
Witnesses
Attorneys

UNITED STATES PATENT OFFICE.

WILLIAM DE FRANG, OF McINTOSH, MINNESOTA, ASSIGNOR OF ONE-HALF TO JOHN KNUTSON, OF McINTOSH, MINNESOTA.

BREAD-CUTTING MACHINE.

1,177,234.　　　　Specification of Letters Patent.　　Patented Mar. 28, 1916.

Application filed August 24, 1915.　Serial No. 47,188.

*To all whom it may concern:*

Be it known that I, WILLIAM DE FRANG, a citizen of the United States, residing at McIntosh, in the county of Polk, State of Minnesota, have invented certain new and useful Improvements in Bread-Cutting Machines; and I do hereby declare the following to be a full, clear, and exact description of the invention, such as will enable others skilled in the art to which it appertains to make and use the same.

This invention relates to new and useful improvements in cutting or slicing machines and is particularly directed to the provision of such a machine for slicing loaves of bread.

It is the object of the present invention to generally improve the structure and efficiency of devices of this character and promote the ease with which they may be operated.

It is more specifically the object to provide such a device wherein the bread is fed by gravity to the cutting portion and wherein said cutting portion is so arranged as to hold the bread and feed it to cut slices of uniform thickness.

It is still further the object to provide such a device wherein the bread when cut drops directly on a plate or other receiving member so that it may be more readily removed.

With the above and other objects and advantages in view, the invention resides more particularly in the novel combination, formation and arrangement of parts as more fully described hereinafter and pointed out in the appended claim.

Reference is had to the accompanying drawings, wherein similar characters of reference designate corresponding parts throughout the several views, and in which:

Figure 1 is a side elevation of the improved machine shown attached to a table or other support; Fig. 2 is a front elevation thereof, but looking at the structure in a plane at a right angle to the general plane of the body thereof, to show the parts in elevation; Fig. 3 is a section on line 3—3 of Fig. 2. Fig. 4 is a transverse sectional view on the line 4—4 of Fig. 1; Fig. 5 is a sectional view taken transversely on the line 5—5 of Fig. 1, and Fig. 6 is a bottom plan view of the cutting disk.

Referring now more particularly to the accompanying drawings the preferred form of the invention is shown as comprising a body or frame comprising a back plate 5 having one side edge directed laterally at 6 to provide a holding wall. This body member is held at a slight inclination from the vertical by an arm 7 extended from the rear face thereof and adapted to be secured on a table or counter so that the lower end of the body extends forwardly of and below the same, the free end of the arm being connected to the body by a suitable brace 8.

The cutting means includes a shaft 9 journaled in bearings 10 at the free edge of the back plate and extended therebelow to carry a knife disk of substantially circular shape and of a radius sufficient to extend its periphery past the holding wall 6 so that bread when placed in the machine will rest on this disk and against the back plate 5 and holding wall. This knife disk is formed in two parts 11 and 12, the part 11 being provided with a cutting edge $11^a$ extending in a curve from the periphery of the disk to a point adjacent the center and disposed past a line drawn from the point of starting through said center, the curvature of said edge increasing toward its inner portion. That portion of the part 11 between the edge $11^a$ and an edge $11^b$ extending from its inner end to the periphery is cut away and disposed in this cutaway portion is the second member 12 which is hinged to the edge $11^b$ so as to extend outwardly at an adjustable angle to part 11. For actuating the disk a shaft 14 is journaled transversely on the intermediate portion of the back of the body plate and is provided with a gear 15 meshing with a similar gear 16 on the shaft 9, the other end of the shaft 14 being provided with a fly wheel 17 carrying an operating handle 18, this fly wheel by its momentum serving to take up the jerking motion incident to engagement of the disk with the bread to cut the same.

In the operation of the device, the shafts are rotated to rotate the disk so the cutting edge $11^a$ of its part 11 rotates counterclockwise (looking downwardly). The bread rests on the disk and as the disk is rotated, the cutting edge $11^a$ cuts into the bread, the bread being held from movement downwardly by slidably seating on the part 12 of the disk. As the cutting action is nearly completed the portion 13 moves past the bread and thus the slice cut may drop, and the bread rests on the part 12 rearwardly of the cutting portion. Thus as rotation of the disk is continued, this operation is repeated to successively cut slices of the bread. Action of the cutting blade holds the loaf of bread against the back plate 5 and the wall 6.

It will be observed that the angularity of the part 12 with relation to the part 11 determines the thickness of the slice cut. To hold this part 12 in any desired adjusted position, an arcuate arm 19 is disposed thereunder and as one end is extended past the part 12 and off-set upwardly and secured at 20 to the part 11. Passed through the other end of the arm 19 is a set screw 21 on which rests the part 12.

A casing 22 is secured at the bottom portion of the machine and has its side wall cut away at 23 to receive a plate onto which the bread is adapted to drop in position ready to be served. This casing is provided intermediately with a transverse partition 24 extending under the knife and provided with an opening 25 through which the bread drops, this partition serving to protect the operator's hand from possible injury by the knife upon the operator reaching into the casing to remove a plate. The body plate and wall may have further associated therewith a suitable cover for the bread, comprising the front wall 26 and side wall 27 secured to the back plate 5 and wall 6 in any desired manner.

Thus from the foregoing it is seen that a comparatively simple yet at the same time highly efficient and readily operated device has been provided. Adjustment of the thickness of slices cut by the machine may be had by varying the space between the planes of the cutting edge portion 12 and the portion 13 of the knife disk, this being done by providing separate disks or by bending or otherwise adjusting a single disk.

What is claimed is:

A bread cutter including a rotatably mounted blade provided with a substantially spiral cutting edge and having a straight edge extending from the outer end of the spiral edge to a point adjacent the inner end of the spiral edge, a member hinged to the blade along the said straight edge for movement to extend at different angles to the blade, said member including a curved portion following the curvature of the spiral edge of the blade from its inner end through a portion of its length, an arm carried by one face of the blade and extending in spaced relation to the blade beyond the straight edge thereof to overlap the hinged member and means carried by the arm and engaging the hinged member for adjustment of the hinged member with respect to the blade.

In testimony whereof, I affix my signature, in the presence of two witnesses.

WILLIAM DE FRANG.

Witnesses:
C. M. BERG,
OLGA IVERSON.

Copies of this patent may be obtained for five cents each, by addressing the "Commissioner of Patents, Washington, D. C."